(No Model.)
W. C. WREN.
PROCESS OF AND APPARATUS FOR DISTILLING AMMONIA.
No. 342,722. Patented May 25, 1886.
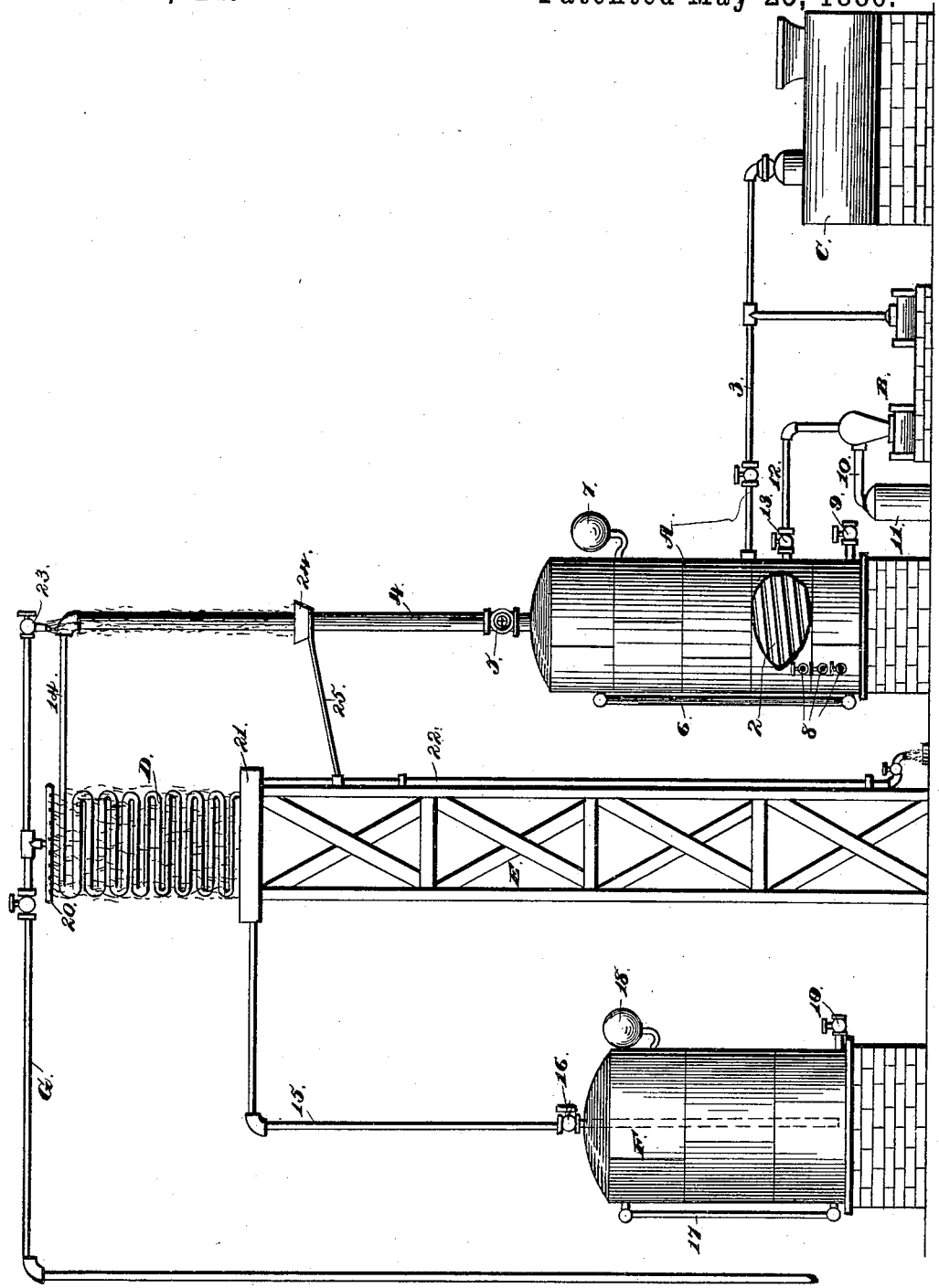
Witnesses:
Charles S. Heyer.
Edward L. Mills.
Inventor:
William C. Wren.
By Dinsmore
Atty.

UNITED STATES PATENT OFFICE.

WILLIAM C. WREN, OF BROOKLYN, ASSIGNOR TO THE CONSOLIDATED REFRIGERATING COMPANY, OF NEW YORK, N. Y.

PROCESS OF AND APPARATUS FOR DISTILLING AMMONIA.

SPECIFICATION forming part of Letters Patent No. 342,722, dated May 25, 1886.

Application filed February 20, 1886. Serial No. 192,627. (No model.)

*To all whom it may concern:*

Be it known that I, WILLIAM C. WREN, a citizen of the United States, residing at Brooklyn, in the county of Kings, State of New York, have invented certain new and useful Improvements in Process of and Apparatus for Distilling Ammonia, of which the following is a specification, reference being had therein to the accompanying drawing.

The object of my invention is to convert the gas produced by the distillation of aqua-ammonia into a pure liquid anhydrous ammonia entirely free from watery vapor without requiring the use of compression-pumps or mechanical devices of any kind, which, as is well known, are now generally employed in this art. The pure liquid ammonia produced by this process is capable of being stored in the receiver in which the conversion takes place, from which it may be drawn off for various uses to which it is adapted.

Heretofore, as is well known, the aqua-ammonia of commerce has generally been distilled into gas in a closed retort or still, such still having to sustain little or no pressure, and after this distillation in a vacuum the gas or vapor is cooled and then compressed into liquid form by and with the aid of a pump or other mechanical compressor.

The accompanying drawing shows an elevation of the entire apparatus employed by me in carrying out my process.

A represents the still in which the aqua-ammonia is vaporized, which is made of steel or boiler-iron plates riveted together, its vertical dimension being much greater than the horizontal diameter. The still contains a coil of pipe, 2, through which steam is admitted, as hereinafter described, through the steam-pipe 3. A stand-pipe, 4, extends from the top of the still to a height of, say, forty feet above the base, communication between the interior of the still and the stand-pipe being regulated by a valve, 5, placed in the pipe just above the top of the still. A glass gage, 6, is mounted on one side of the still, communicating with the interior, in order that the height of the aqua-ammonia in the still may be readily ascertained. A pressure-gage, 7, of ordinary construction, is also connected with the still.

A number of test-cocks, 8, are inserted into the still, placed in a vertical row near the bottom, for the purpose of detecting the presence of ammonia before drawing off the waste water and condensed steam through the cock 9, the latter, if desired, being connected to a drain or sewer.

B represents a feed-pump, which must be capable of delivering aqua-ammonia into the still under or against a pressure of one hundred and fifty pounds to the square inch. The suction end of this pump is connected by a hose or pipe, 10, to a cylinder, 11, or other suitable vessel containing a supply of aqua-ammonia. The discharge end is connected by a pipe, 12, having a cock, 13, with the interior of the still, near the bottom thereof.

The still and all its connections must be strongly made to be capable of withstanding a very heavy pressure.

C represents any ordinary form of steam-boiler, which supplies steam to the coil. A coil of pipe, D, is mounted on a frame-work, E, so that its upper section may be connected by a horizontal pipe, 14, with the stand-pipe 4. Connected with this coil is a discharge-pipe, 15, which enters the top of a receiving-tank, F, and extends nearly to the bottom thereof, a cock, 16, being placed in the pipe 15 just above the top of the receiver. The receiver has a glass gage, 17, and pressure-gage 18, as shown, and a draw-off cock, 19, near the bottom.

G represents a water-pipe, through which water may be forced by any suitable means. The pipe extends above the coil D, where it is provided with a perforated sprinkler, 20, through which water is allowed to drip upon the coil, the water running down on the outside of the coil and into a trough, 21, connected to a waste-pipe, 22. The main water-pipe extends to a point above the stand-pipe, where it has a cock, 23, which may permit water to drip down upon the upper part of the stand-pipe and run down into a trough, 24, connected by a branch, 25, to waste-pipe 22. The upper part of the stand-pipe and the entire coil D thus act as coolers.

In the operation of distilling the ammonia from the water to be afterward converted into liquid anhydrous ammonia, the aqua-ammonia is first pumped into the still by the feed-pump B from the cylinder in which it is stored until the still is about two-thirds full, as indicated by the glass gage. The cock 13 in the ammonia-supply pipe, the cock 5 in the stand-pipe, and the cock 16 in the discharge-pipe are open, all the rest being closed. When the still is sufficiently full, the cock in the steam-pipe is opened and boiler-steam is admitted into the steam-coil in the still. The effect of this is to vaporize the ammonia which escapes as a gas into the stand-pipe 4, while the greater part of the water remains in the still. At this stage in the process the ordinary and usual practice is to draw off the ammoniacal gas, cool it, and then convert it into a liquid in a separate vessel by a pump or other mechanical compressor. Instead of this, however, I keep increasing the heat by the admission of more steam, which necessarily increases the pressure until all the ammonia is driven from the water. It is a well-known fact that the affinity of water and ammonia-gas for each other decreases with an increase in heat, and since the ammonia, being the lighter, is always on top as the pressure increases any amount of water or watery vapor which may rise in the stand-pipe is condensed before reaching the great height to which the stand-pipe is carried, as well as by the effect of the water dripping upon the outside of the stand-pipe, as before described, and falls back into the still, leaving the ammoniacal gas to pass to the coil D. It is there cooled by the water which is sprinkled upon the coil, and is then forced by gravity and the pressure from the still through the discharge-pipe and into the bottom of the receiver. In this receiver, by means of the continuous pressure from the still throughout the pipes, it is liquefied, the pressure required to liquefy ammoniacal gas being about six and one-half atmospheres.

Since the discharge-pipe extends nearly to the bottom of the receiver, a very small quantity of liquefied ammonia will cover the mouth of the pipe, so that a siphon is formed, and thereafter the gas will liquefy much more rapidly and readily than if the discharge-pipe terminated near the top of the receiver.

When it is desired to stop working the apparatus, and the ammonia has been entirely separated from the water in the still, a fact which can be ascertained by the series of test-cocks in the still, the cock 16 in the discharge-pipe is closed, which will prevent any expansion of the liquid in the receiver. The draw-off cock in the bottom of the still may then be opened to draw off the waste water, and the steam shut off from the coil, which closes the operation. A new supply of aqua-ammonia may then be admitted to the still and more steam to the coil until the pressure-gages show that the pressure in the still and that in the receiver equal each other, when the valves in the stand-pipe and discharge-pipe are opened, and the formerly-described operation is repeated. Distillation can be continued for a time with a continuous forcing of aqua-ammonia into the still until the glass gage shows that too much liquid has been admitted, when the water may be drawn off from below the ammonia to the necessary extent.

If the pressure in the still during the operation should fall at any time below that in the receiver, either from lack of heat or the presence of too much cold ammonia in the still, then the cock 5 should be instantly closed and remain closed until the pressure-gage indicates a restoration of the pressure in the still, so that it exceeds that in the receiver.

When the receiver is full of ammonia it may be drawn off into a separate tank or receiver until the latter is full, or until the pressure therein equals that of the receiver. The pressure of the gas above the receiver also tends to force the liquid out of such receiver until the separate vessel is full.

Having thus described my invention, what I claim as new, and desire to secure by Letters Patent, is—

1. The process of converting aqua-ammonia into liquid anhydrous ammonia, which consists in first vaporizing aqua-ammonia, cooling the vapor, and discharging it into a receiver, the vapor being under constant pressure during the entire operation, substantially as described.

2. An apparatus for the manufacture of anhydrous ammonia, consisting of a still provided with a steam-coil for heating and means for a continuous liquid-supply, a pipe leading from said still to a receiver, and a cooler located between the still and receiver, substantially as described.

3. In an apparatus for manufacturing anhydrous ammonia, the combination of a retort containing a vaporizing-coil, a vertical stand-pipe leading from the top of the still, a cooling-coil, and a receiver connected with the cooling-coil, substantially as described.

4. In an apparatus for manufacturing anhydrous ammonia, the combination of a vaporizing-still, a vertical stand-pipe, a conveying and discharging pipe, a cooling-coil connected to the still and also to the discharge-pipe, a receiver, and a water-pipe having an outlet above the cooling-coil, substantially as described.

5. In an apparatus for manufacturing anhydrous ammonia, the combination of a vaporizing-still, a cooling-coil, a receiver, a steam-pipe connecting the still and cooling-coil, a water-pipe connected to a sprinkler above the cooling-coil, said pipe having an outlet above the stand-pipe, and a discharge-pipe connecting the cooling-coil with the receiver, substantially as described.

6. In an apparatus for manufacturing anhydrous ammonia, the combination of a vaporizing-still, a vertical stand-pipe, a cooling-coil, a receiver, and a discharge-pipe connecting the cooling-coil with the receiver and extending nearly to the bottom of said receiver, substantially as and for the purpose set forth.

7. The combination, with the vaporizing-still A, of the steam-coil within such still, the stand-pipe 4, the draw-off cock at or near the bottom of the still, and the test-cocks 8, substantially as described.

8. The combination, with the vapor-conveying pipes, of the water-pipe G, the waste-pipe 22, the trough 24, and the branch pipe 25, substantially as described.

In testimony whereof I affix my signature in presence of two witnesses.

WILLIAM C. WREN.

Witnesses:
I. ENSIGN FULLER,
WILLIAM H. LEWIS.